United States Patent
Michaelis et al.

(10) Patent No.: US 7,065,367 B2
(45) Date of Patent: Jun. 20, 2006

(54) INTERFACE SELECTION IN A WIRELESS COMMUNICATION NETWORK

(76) Inventors: Oliver Michaelis, 5371 Renaissance Ave., San Diego, CA (US) 92122; Marcello Lioy, 11929 Miro Cir., San Diego, CA (US) 92131

(*) Notice: Subject to any disclaimer, the term of this patent is extended or adjusted under 35 U.S.C. 154(b) by 264 days.

(21) Appl. No.: 10/194,029

(22) Filed: Jul. 11, 2002

(65) Prior Publication Data

US 2004/0009751 A1 Jan. 15, 2004

(51) Int. Cl.
 *H04Q 7/20* (2006.01)
(52) U.S. Cl. .............. 455/452.2; 455/435.3; 455/552.1; 455/509; 455/512; 370/342
(58) Field of Classification Search ............ 455/41.2, 455/41.3, 11.1, 552.1, 509, 512; 370/310, 370/315, 328, 342, 345, 347
See application file for complete search history.

(56) References Cited

U.S. PATENT DOCUMENTS 6,122,514 A * 9/2000 Spaur et al. ............... 455/448
6,466,557 B1 * 10/2002 Doi ........................... 370/332

FOREIGN PATENT DOCUMENTS

| EP | 0998096 A2 | 5/2000 |
| WO | 9829975 | 7/1998 |
| WO | 0152501 A2 | 7/2001 |
| WO | 0158190 A1 | 8/2001 |
| WO | WO 01/58190 A1 * | 8/2001 |

\* cited by examiner

*Primary Examiner*—Doris H. To
*Assistant Examiner*—Sanh Phu
(74) *Attorney, Agent, or Firm*—Philip R Wadsworth; Charles D. Brown; George C. Peppas (57) ABSTRACT

This disclosure is directed to techniques for selection of wireless network interfaces for data communication within an access terminal. The techniques may rely on a set of interface selection rules to identify network interfaces that are eligible to serve a particular communication application or the type of traffic forwarded on behalf of another device. In addition, each network interface may be assigned a priority. Upon identifying eligible interfaces, e.g., interfaces that satisfy all of the interface selection rules, the techniques may involve selection of the eligible interface having the highest priority. The assigned priority may be dynamically adjusted based on the connection state of the interfaces, prioritization according to changes in system latency, interface cost, and the like.

45 Claims, 6 Drawing Sheets

|  | RULE 0 | RULE 1 | RULE 2 | ••• | RULE N | DYNAMIC PRIORITY |
|---|---|---|---|---|---|---|
| INTERFACE 0 | X | X |  |  |  | 4 |
| INTERFACE 1 | X | X | X |  | X | 2 |
| INTERFACE 2 | X |  |  |  | X | 3 |
| INTERFACE 3 | X | X | X |  | X | 1 |
| ⋮ |  |  |  |  |  |  |
| INTERFACE N | X | X |  |  | X | N |

|  | RULE 0 | RULE 1 | RULE 2 | ••• | RULE N | DYNAMIC PRIORITY |
|---|---|---|---|---|---|---|
| INTERFACE 0 | X | X |  |  |  | 4 |
| INTERFACE 1 | X | X | X |  | X | 2 |
| INTERFACE 2 | X |  |  |  | X | 3 |
| INTERFACE 3 | X | X | X |  | X | 1 |
| ⋮ |  |  |  |  |  |  |
| INTERFACE N | X | X |  |  | X | N |

INTERFACE SELECTION IN A WIRELESS COMMUNICATION NETWORK

TECHNICAL FIELD

The disclosure relates to wireless communication and, more particularly, selection of network interfaces for data communication within a wireless communication system.

BACKGROUND

In a wireless communication network, network nodes exchange data using network communication protocols. Internet Protocol (IP) is an example of a network communication protocol that facilitates packetized data communication between network nodes. A wireless communication device, or "access terminal (AT)," can be used to transmit and receive IP packets via a variety of different wireless network interfaces such as IS95 CDMA, CDMA2000, WCDMA, CDMA 1xEV-DO, GSM GPRS, WCDMA GPRS, IEEE 802.11(a), IEEE 802.11(b), IEEE 802.11(g), Bluetooth, and other interfaces. A wireless network interface may provide access to network nodes, e.g., web servers, email servers, or messaging servers, residing on an IP network such as the Internet. The traffic transmitted and received by an AT may be originated by or destined for the AT. Alternatively, the traffic may be forwarded by the AT on behalf of another device attached to it, such as a personal digital assistant (PDA), notebook computer or the like.

Some ATs may support more than one of the wireless network interfaces. In addition, within a given coverage area, more than one wireless network access point ($U_m$) may be available to serve packets transmitted or received by a particular communication application running on the AT. For example, the coverage area may provide a number of long-range wireless network access points based on various communication standards, as well as short range wireless network access points based on other standards such as wireless local area networking (WLAN) standards. Accordingly, an AT may be equipped to select different wireless network interfaces to serve, via the available network access points, packets associated with particular communication applications such as web browsing, email, messaging or the like.

SUMMARY

This disclosure is directed to techniques for selection of wireless network interfaces for data communication within a wireless communication network. The techniques may rely on a set of interface selection rules to identify wireless network interfaces that are qualified to serve packets associated with a particular communication application. A wireless network interface may be qualified in the sense that it satisfies all of the interface selection rules for a given packet. Each wireless network interface may be assigned an explicit priority, permitting the interfaces to be prioritized in terms of relative cost, latency, bandwidth, signal strength, quality of service (QoS), bearer requirements, or the like. Thus, interface priority may be explicitly identified, rather than inferred from the order in which the interface selection rules are applied.

Upon identifying one or more qualified interfaces for a given packet, e.g., interfaces that satisfy all of the interface selection rules, the techniques may involve selection of the qualified interface having the highest priority. The assigned priorities may be dynamically adjusted, however, based on the connection states of the wireless network interfaces. Dynamic prioritization permits consideration of changes in interface properties such as cost and latency when connection state changes. In this manner, a first interface may have a higher priority than a second interface when both interfaces are connected to respective access points, but a lower priority when the second interface is connected and the first interface is not. Thus, the priority assigned to a given interface may be dynamically adjusted to reflect current interface state, e.g., on a packet-by-packet basis. In addition, explicit prioritization may promote processing efficiency in selecting the appropriate interface.

In one embodiment, the disclosure provides a method comprising assigning priorities to wireless network interfaces, and updating the priorities assigned to the wireless network interfaces based on status of the interfaces. The method further comprises selecting one of the wireless network interfaces for access by a wireless AT based on interface selection rules and the resulting priorities.

In another embodiment, the disclosure provides a wireless AT that assigns priorities to wireless network interfaces, and updates the priorities assigned to the wireless network interfaces based on status of the interfaces. The AT selects one of the wireless network interfaces for access based on interface selection rules and the priorities.

In a further embodiment, the disclosure provides a computer-readable medium comprising instructions that cause a processor to assign priorities to wireless network interfaces in a wireless AT, select one of the wireless network interfaces for access based on interface selection rules and the priorities, and update the priorities assigned to the wireless network interfaces based on status of the interfaces.

The techniques described herein may be implemented in hardware, software, firmware, or any combination thereof. If implemented in software, the techniques may be directed to a computer readable medium comprising program code, that when executed, performs one or more of the techniques described herein.

The details of one or more embodiments are set forth in the accompanying drawings and the description below. Other features, objects, and advantages will be apparent from the description and drawings, and from the claims.

DETAILED DESCRIPTION

Figure 1:
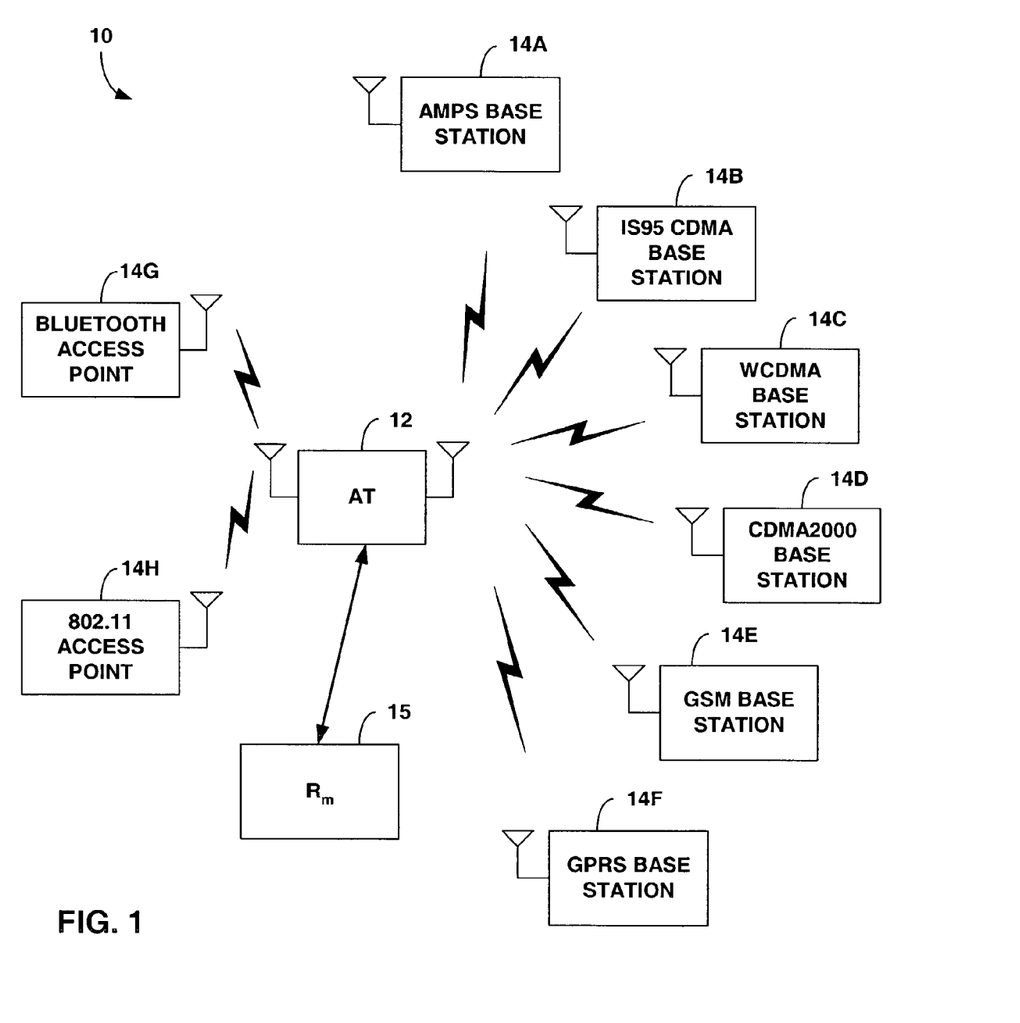
FIG. 1 is a block diagram illustrating a wireless communication network.

FIG. 1 is a block diagram illustrating a wireless communication network 10. As shown in FIG. 1, wireless communication network 10 may include one or more wireless access terminals (ATs) 12. AT 12 may be configured to provide data communication via two or more wireless network interfaces. Each wireless network interface permits data communication with one or more wireless network access ($U_m$) points 14 that may be available within a given wireless coverage area. The data communicated by AT 12 may be in the form of packet data, packet voice data, or circuit voice data. Furthermore, the data communicated may result from local applications running on AT 12 or from applications running on other devices attached to the AT, such as PDA's, notebook computers, and the like. In the latter case, AT 12 forwards the data to and from the network interfaces on behalf of the other device.

For purposes of illustration, as shown in FIG. 1, a given coverage area may provide a variety of wireless network access points 14 such as an AMPS base station 14A, an IS95 CDMA base station 14B, a WCDMA base station 14C, a CDMA2000 base station 14D, a GSM base station 14E, a GPRS base station 14F, a Bluetooth network access point 14G and an IEEE 802.11 access point 14H. Access point 14H may be, for example, an IEEE 802.11(a), 802.11(b) or 802.11(g) access point. The types, number, and variety of network access points shown in FIG. 1 are purely for purposes example, and should not be considered limiting of the techniques broadly described and embodied in this disclosure.

In the example of FIG. 1, some of network access points 14A–14F are long range access points, whereas other network access points 14G, 14H provide short range access points. Thus, AT 12 may be equipped with one or more long-range wireless network interfaces and one or more short-range network interfaces.

As further shown in FIG. 1, wireless communication network 10 also may include one or more wired ($R_m$) interfaces 15 for AT 12. Examples of wired ($R_m$) interfaces include RS232 ports, USB ports, Bluetooth personal area network (PAN) interfaces, or the like. Although the Bluetooth personal area network interface would be wireless, it is ordinarily considered an $R_m$ interface because it ranges only a few feet. The $R_m$ interface may provide connectivity between AT 12 and another device, such as a PDA, notebook computer or the like.

AT 12 may be configured to use wireless network interfaces 14 on a selective basis to serve packets associated with particular communication applications, e.g., web browsers, email, messaging or the like. Again, the communication applications may be running on AT 12, as well as particular traffic streams forwarded on behalf of other devices via the $R_m$ interface 15. In particular, AT 12 may rely on a set of interface selection rules to identify wireless network interfaces 14 that are qualified to serve packets associated with a particular communication application.

A wireless network interface 14 may be qualified in the sense that it satisfies all of the interface selection rules for the communication application. Examples of interface selection rules may include maximum cost, maximum system latency, maximum bandwidth, minimum signal strength, service bearer requirements, adherence to quality of service (QoS) requirements, if applicable, or other rules that match packets for a given communication application to an appropriate wireless network interface 14.

Cost may refer to the amount charged for airtime over a given network access point 14 by a service bearer, a per-connection charge, e.g., connection setup cost, a per-data-unit charge, or a combination thereof. System latency may refer to the time delay in establishing a connection over a given network interface and access point 14 to serve packets for a particular communication application, as well as to typical round trip time (RTT) associated with the established connection. Bandwidth may refer to the bit rate at which data can be transmitted to and from AT 12 over a given network interface and access point 14. Signal strength may refer to the detected strength of signals communicated, i.e., transmitted and received, by AT 12 over a particular network interface and access point 14. Quality of service (QoS) may refer to the ability of a particular access point to deliver an assured level of bandwidth and latency required for a given communication application.

Together, the above characteristics may form a set of rules for selection of an appropriate, and perhaps optimal, interface for service of packets associated with a communication application. As will be described, the interface selection rules may be arranged in the form of rule classes within an access control list (ACL). A smaller or larger set of rules may be employed by AT 12. In addition, the selection rules may be applied on a packet-by-packet basis. This feature may be especially useful when multiple communication applications are running at once, producing multiple packet streams.

Although a first network interface may be initially selected to serve a given packet for a communication application, AT 12 may periodically change network interfaces as network conditions change on a packet-by-packet basis. In particular, as mentioned above, AT 12 may apply the rules on a packet-by-packet basis, permitting changes in interface selection for each new packet sent by a communication application, but more typically different interface selections may apply to packets from different communication applications running concurrently on AT 12. Additionally, AT 12 may permit an application to request a specific network interface, e.g. for a service tied to a specific service bearer.

A change in interface selection may occur, for example, if changes in the status of an interface relative to the selection rules change. If the cost or latency of an interface increases, for example, a selected interface's priority may no longer satisfy the selection criteria for a given packet and hence be removed from the set of qualified interfaces. This type of change may occur somewhat frequently in the case of a mobile AT 12 that moves from coverage area to coverage area, and experiences roaming and handoff among different wireless access points 14.

AT 12 also may assign priorities to the wireless network interfaces. Upon identifying one or more qualified interfaces, e.g., interfaces that satisfy all of the interface selection rules, AT 12 may select the qualified interface having the highest priority. The assigned priorities may be explicitly specified and dynamically adjusted, in accordance with this disclosure, based on the connection state of the wireless network interfaces to respective access points 14.

In a wireless network, such as network 10, a wireless network interface is not always connected to a wireless access point 14 even though the interface may be in an "up" state from the perspective of a communication application running on AT 12 or a device coupled to AT 12. For a CDMA2000 data connection, for example, a point-to-point protocol (PPP) communication interface may be in the "up," i.e., active, state even though the interface may not be connected to CDMA2000 base station 14D over the traffic channel. In this case, the pertinent interface is dormant. Thus, although a point-to-point protocol (PPP) communication interface associated with CDMA2000 base station 14D may be available, the physical connection to the CDMA2000 base station 14D is not.

Accordingly, selection of the network interface to the CDMA2000 base station 14D may introduce different degrees of system latency according to whether the physical connection is up or not. If the physical connection has not been established, an amount of system latency may be introduced in bringing up the connection. Such latency can be disconcerting to the user and affect perceived quality of service.

In addition, connection setup costs necessary to establish the physical connection may increase the cost associated with use of a particular wireless network interface. In this case, another qualified wireless network interface that also satisfies all of the interface selection rules may be more desirable, e.g., in terms of cost or latency, if its physical connection is already established.

Furthermore, switching between two wireless network interfaces may incur additional cost on the network for moving the connection-related information between routing entities, making an already established connection relatively more preferable. For these reasons, this disclosure contemplates a dynamic prioritization technique that takes into account the actual connection state of the wireless network interfaces to wireless access points 14 in assigning priorities for interface selection.

Thus, dynamic prioritization as described herein permits consideration of changes in interface properties such as cost or system latency when connection state changes. Connection states may change, for example, when coverage conditions change and a connection is dropped or acquired. Also, in some cases, an interface that was not previously up may be brought up by another communication application, in which case the priority for the interface may be upgraded.

Prioritization may be adjusted based on the state changes of the physical connection of a network interface independently of the traffic transmitted or received. The priorities may be applied on a packet-by-packet basis, permitting changes in the selection of a wireless network interface during the course of execution of a particular communication application running on AT 12. In general, the techniques may involve assigning priorities to wireless network interfaces, and selecting one of the wireless network interfaces for access by AT 12 based on interface selection rules and the priorities. The technique may further involve, moreover, updating the priorities assigned to the wireless network interfaces based on status of the interfaces, e.g., the connection status of the interfaces. Although the interface selection rules may be generally static, prioritization preferably is dynamic. As an additional feature, the priorities may be explicitly assigned to the interfaces so that there is no need to infer priority from the order of the rule classes within an access control list.

Figure 2:
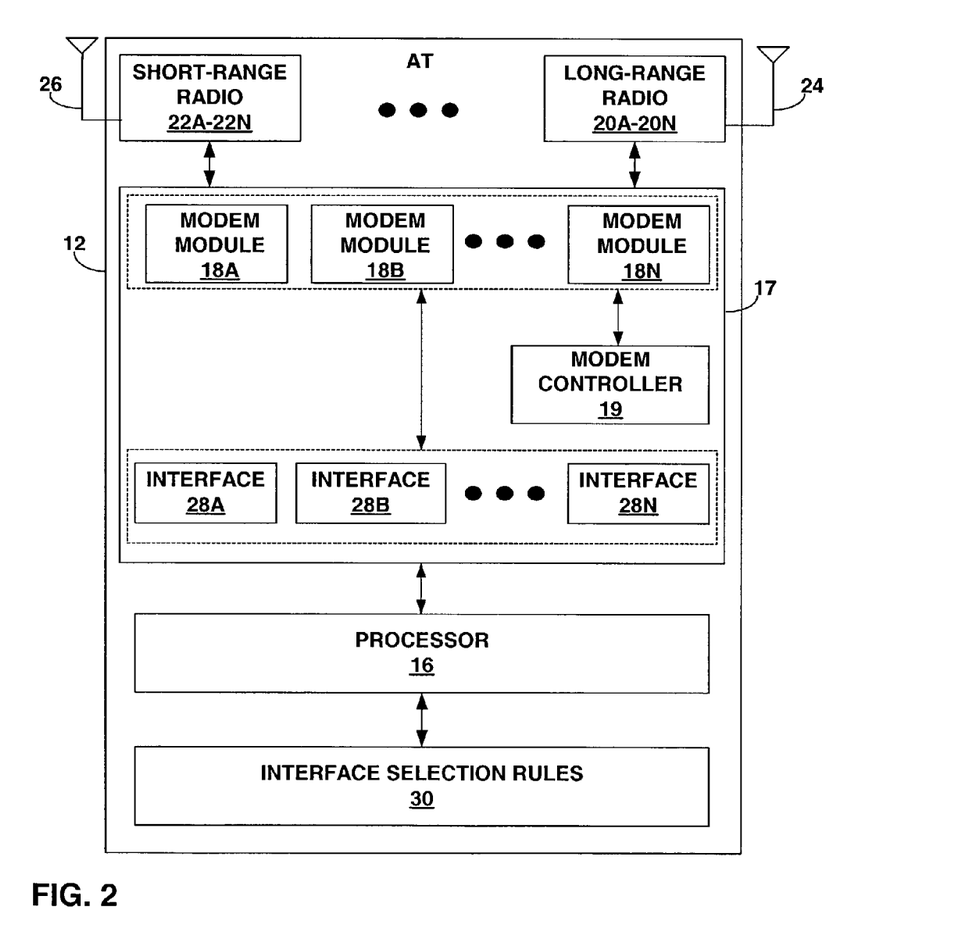
FIG. 2 is a block diagram illustrating an example AT useful in the wireless communication network of FIG. 1.

FIG. 2 is a block diagram illustrating an example AT 12 useful in wireless communication network 10 of FIG. 1. As shown in FIG. 2, AT 12 may include a processor 16, a modem 17 having one or more modem modules 18A–18N (collectively modem modules 18), a modem controller 19, and one or more long-range or short-range radio circuits 20 and 22, respectively. Long-range radio circuit 20 may transmit and receive wireless signals carrying packetized data over a radio-frequency antenna 24 providing connectivity to a wide area wireless network. Short-range radio circuit 22 may transmit and receive wireless signals over a radio-frequency antenna 26 that provides connectivity to a local area network or personal area network. Additionally, AT 12 may provide interfaces (not shown) for local connectivity to other devices such as a PDA, notebook computer, or the like. The local interfaces may use wired ($R_m$) connections such as RS-232, USB, or the like, or wireless connections such as Bluetooth PAN. Modem modules 18 modulate digital information received from processor 16 for transmission via radio circuits 20, 22. In addition, modem modules 18 demodulate wireless signals received via radio circuits 20, 22 to produce digital information for processing by processor 16. Modem controller 19 controls modem modules 18 and monitors modem status to determine interface states, i.e., connection states with particular access point 14 within network 10.

Processor 16 may select one of several wireless network interfaces 28A–28N (interfaces 28) to serve packets associated with different communication applications running on AT 12, as well as traffic forwarded on behalf of other devices attached to the AT, e.g., via an $R_m$ interface. Wireless network interfaces 28 may be realized by shared or dedicated hardware components, programmable features, or a combination thereof, and may form part of modem 17.

A particular modem module 18 might use one or more network interfaces 28 for a communication session. For example, a WCDMA modem module 18 could use two different WCDMA network interfaces 28 for separate packet data protocol (PDP) contexts. Processor 16 may access a set of interface selection rules 30 stored on AT 12, and select one of wireless network interfaces 28 based on the interface selection rules. For example, a different set of interface selection rules 30 may be provided for each type of wireless network interface provided by AT 12. The interface selection rules may be stored as rule classes within a data structure such as an ACL, as will be described.

The communication application running on AT 12, or another device coupled to AT 12, may specify traffic meta information allowing the processor 16 to select the most appropriate wireless network interface 28. The meta-information may be used as input to the ACL to determine the priority of each wireless network interface 28 for a particular type of packet. Furthermore, the traffic meta information may specify application requirements for cost, latency, special bearer capabilities, and the like.

As described herein, a set of interface selection rules 30 may be associated with a set of priorities that are assigned to different wireless network interfaces 28. Based on the assigned priorities, processor 16 selects a wireless network interface 28 from a set of one or more wireless network interfaces that satisfy the pertinent interface selection rules.

Specifically, if a number of wireless network interfaces 28 satisfy all of the interface selection rules for a given communication application or type of traffic, processor 16 selects the interface with the highest priority. Advantageously, processor 16 may be programmed to dynamically adjust the priorities of wireless network interfaces 28 according to changes in interface status, such as physical connection status.

AT 12 may take the form of a mobile AT that sends, receives, and forwards data via the wireless communication channel provided by any of wireless network interfaces 28, and may take the form of a cellular radiotelephone, satellite radiotelephones, PCMCIA card incorporated within portable computers, PDAs equipped with wireless communication capabilities, and the like. In addition, AT 12 may include voice communication capabilities, particularly when embodied as a mobile handset or a voice-capable PDA. Mobile ATs 12 may employ a variety of communication techniques for data and voice communication, including those represented by the various wireless access points 14 illustrated in FIG. 1.

Wireless network access points 14 may take the form of long-range base station antennas and base station controllers equipped for data communication, voice communication, or both. Some of wireless network access points 14 may take the form of short-range wireless access points for wireless local area networking, e.g., Bluetooth or IEEE 802.11. For data communication, mobile AT 12 may take the form of a dual stack device that is capable of communication according to both a first network communication protocol, e.g., Internet Protocol version 6 (IPv6), and a second network communication protocol, e.g., Internet Protocol version 4 (IPv4). In other words, AT 12 may implement both an IPv4 protocol stack and an IPv6 protocol stack, each-configured for mobile applications.

Figure 3:
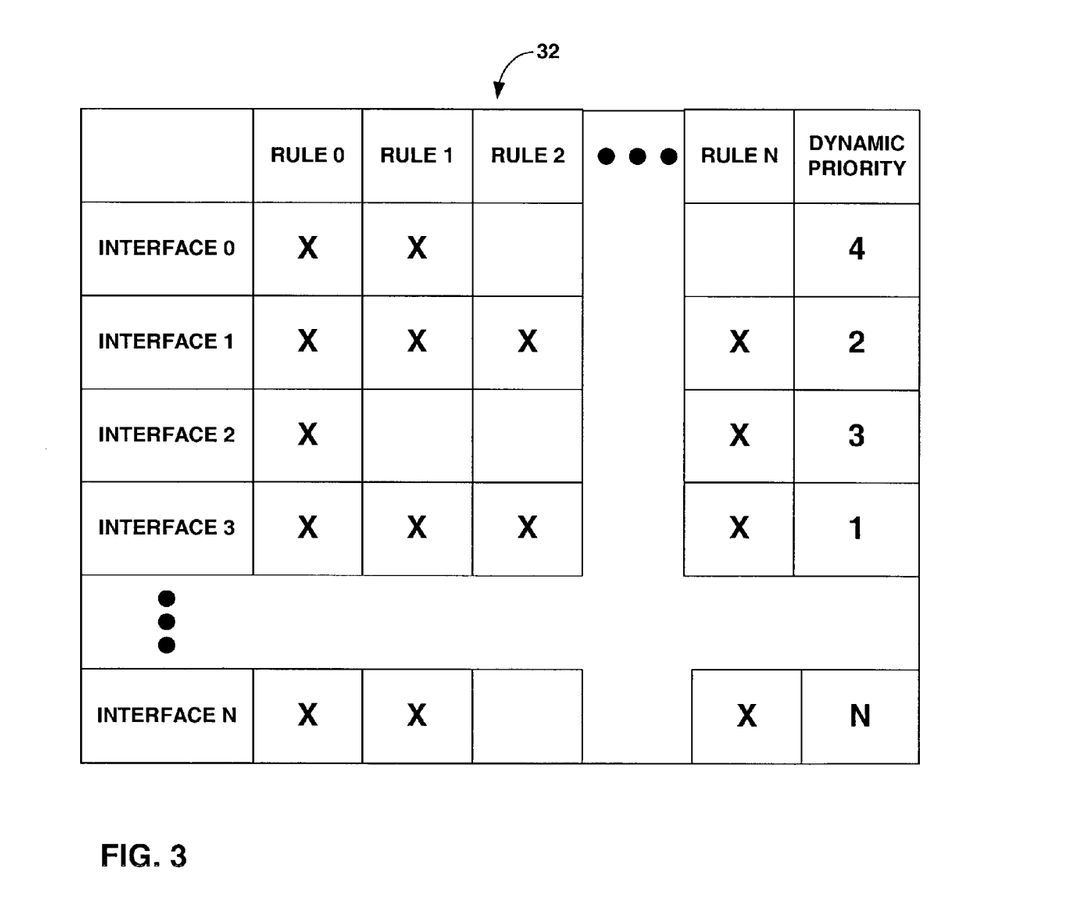
FIG. 3 is a diagram illustrating a set of interface selection rules with dynamic assignment of explicit priorities.

FIG. 3 is a diagram illustrating a set 32 of interface selection rules with dynamic prioritization. As shown in FIG. 3, rule set 32 is applied to a given packet processed by AT 12. Rule set 32 contains a number of rules (Rule 0 through Rule N) that are applied to each of multiple wireless network interfaces (Interface 0 through Interface N). In addition, each interface has an assigned priority that, in effect, ranks the interfaces in order of preference in the event more than one interface satisfies all of the rules, i.e., "matches" on all rules.

As will be described, the interface selection rules may take the form of a set of rule classes within modified access control list (ACLs). Each ACL pertains to a given wireless network interface 14. A particular communication application specifies its QoS, cost, latency, bearer requirements, and the like by attaching traffic meta information to the packets processed by AT 12. The meta information, as well as the TCP/IP header information, associated with each packet are applied to the ACL for each wireless network interface 14 for interface selection. Processor 16 processes the complete list of ACLs for all configured interfaces 14, updates the interface priorities, and selects the highest priority interface that matches on the rules in its ACL In the example of FIG. 3, both Interface 1 and Interface 3 match on all of rules 0–N for a given packet, as indicated by the "X" entered for each interface in correlation with respective rules. To select one of the interfaces and, in effect, "break the tie," processor 16 relies on the relative priorities explicitly assigned to Interface 1 and Interface 3. In FIG. 3, Interface 1 carries priority "2" and Interface 3 carries priority "1." Accordingly, processor 16 selects the higher priority interface, Interface 3, to serve the packet for the communication application. Again, the priorities may be adjusted dynamically according to the connection state of the interfaces.

Although Interface 3 may be initially selected to serve packets for a given communication application, Interface 1 may be selected for a subsequent packet if interface connection states change and, therefore, priorities change. For example, if Interface 1 and Interface 3 are both connected, but the connection for Interface 3 is lost, the priority of Interface 1 may be upgraded. In this case, processor 16 may select Interface 1 to serve the current packet sent by the communication application. As another example, Interface 1 may hold a lower priority than Interface 3 because its connection is not up. In this case, it may be more efficient to serve the communication application over an interface, e.g., Interface 3, for which the connection is already established, rather than incur airtime cost and system latency in bringing up the Interface 1 connection.

If the Interface 1 connection is brought up to serve a different communication application, however, the priorities may change so that Interface 1 now holds the higher priority. The Interface 1 connection may be brought up, for example, to serve a communication application that could not make use of Interface 3 because Interface 3 did not match on all of the rules for the particular communication application. Thus, processor 16 may be configured to track the connection states of the various interfaces for use in dynamic assignment of priorities within the rule sets 32 for different communication applications.

Notably, in accordance with this disclosure, rule set 32 may be arranged in an order unrelated to the priorities assigned to wireless network interfaces 28. In operation, processor 16 can be configured to parse a data structure containing the rules for a particular interface. In some instances, processor 16 could be configured to identify the first interface 28 in the data structure, ordered from start to end of file, that matches on all of the interface selection rules, and select the identified interface. In other words, processor 16 could implement a true/false check of rule compliance and then return the first match it encounters.

More preferably, however, processor 16 may be configured to process the rule set completely, identify one or more interfaces 28 that match on all of the interface selection rules, and then select one of the interfaces based on the explicitly assigned priority. The explicitly assigned priority typically will have no relationship to the order in which the interface appears within the data structure. In this manner, there is no need to reorder interfaces 28 within the data structure according to a change in priority. On the contrary, processor 16 may dynamically associate explicit priorities with interfaces 28, instead of simply inferring priority from the order of the interface 28 within the rule set.

In some embodiments, processor 16 may be configured to dynamically reorder interfaces 28 within the data structure according to assigned priorities. Assignment of explicit priorities rather than reordering the data structure can provide significant computing efficiencies, however, particularly within an AT 12 that updates the priorities and makes interface selections on a packet-by-packet basis. In particular, the processing resources associated with AT 12 may be limited. In addition, excessive processing overhead can produce excess power consumption, which may be especially undesirable for a mobile AT 12 that relies on a finite reserve of battery power. By changing the priorities rather than reordering the data structure, the interface selection techniques described herein can conserve processing and power resources and reduce processing time.

As mentioned above, rule set 32 may be presented in the form of one or more ACLs. In this manner, processor 16 may handle interface selection by organizing the rule set and interfaces 28 within modified access control lists (ACLs) in which each interface is assigned one or more ACLs. Rules within an ACL are associated with rule classes, which in turn correspond to certain priorities assigned by processor 16. The mapping of rule classes to priorities is done dynamically. For example, processor 16 may access the rule set as an array that is indexed by rule class identification and contains the associated explicit priorities. Typically, ACLs implement rule prioritization by their order of appearance in the ACL. The rules within an ACL are ordered to allow the first match to also be treated as the highest priority, which ordinarily is not dynamically changed in software. AT 12 makes use of a modified ACL in the sense that prioritization is not dependent on the position of a rule class, i.e., an interface, within the ACL. Rather, the priorities can be dynamically and explicitly assigned, without regard to the order of the rules within the ACL.

The use of a modified ACL or other rule set, as described herein, permits the dynamic upgrading and downgrading of the priority of a given interface. This dynamic prioritization, in turn, allows processor 16 to maintain a prioritization among interfaces 28 while giving weight to the present "up" status, i.e., connected rather than dormant, of the interface. As another example, assume that AT 12 has service available from both a first interface and a second interface. Although the first interface is preferential for some reason, e.g., cost, it might be desirable to continue use of the second interface if AT 12 is already connected via the second interface. Again, the establishment of a connection over the first interface may generate undue cost or latency that outweighs the default preference for the first interface. Thus, dynamic prioritization allows AT 12 to associate a cost with switching from a currently connected interface to an otherwise preferential interface.

Figure 4:
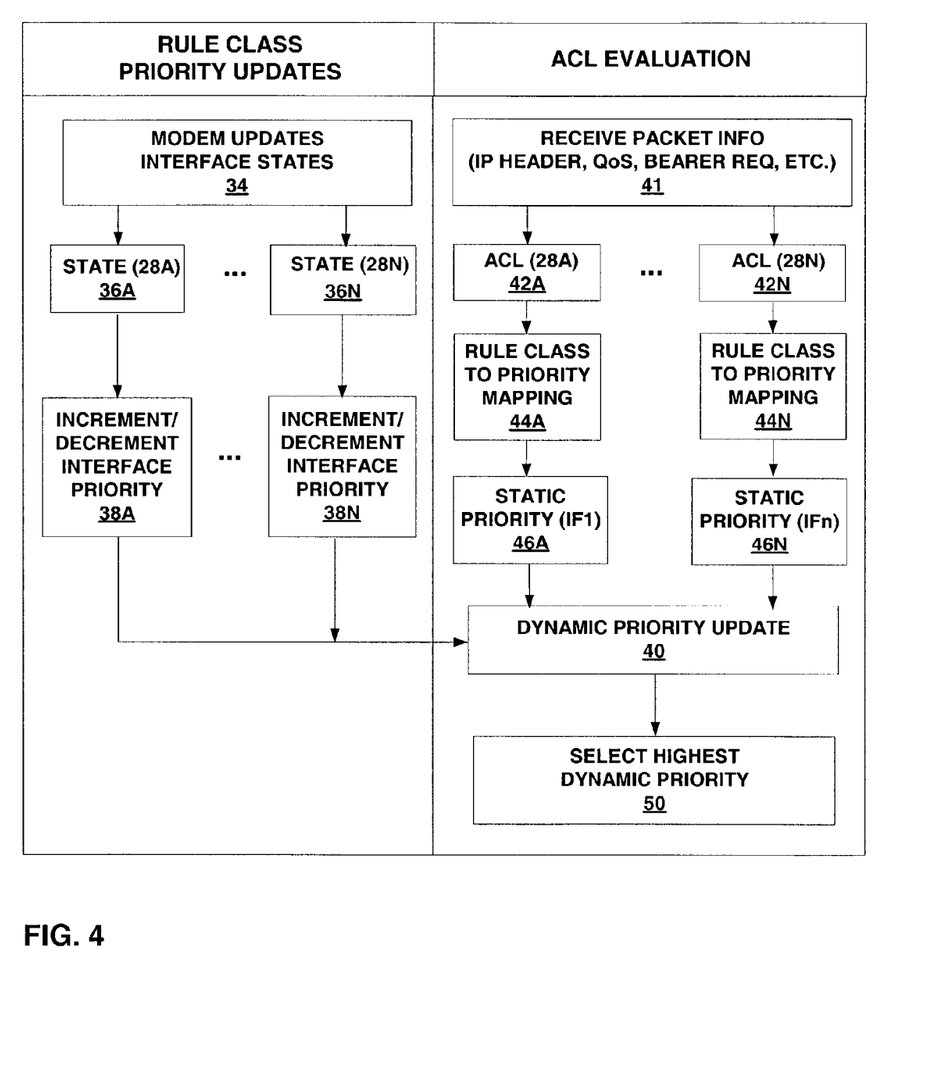
FIG. 4 is a flow diagram illustrating priority update and access control list (ACL) evaluation processes for interface selection.

FIG. 4 is a flow diagram illustrating priority update and access control list (ACL) evaluation processes for interface selection. As shown in FIG. 4, to process interface priority updates for the rule classes in a modified ACL, modem controller 19 updates the interface states (34) of the various interfaces 28 (36A–36N). Based on the interface state updates, processor 16 determines whether to increment or decrement the priority for each interface (38A–38N). This decision is provided to a process for dynamic priority updates (48), which forms part of an ACL evaluation process.

As further shown in FIG. 4, the ACL evaluation process, which may run in parallel with the priority update process, receives packet information (40) to be used for ACL evaluation. For example, the packet information may include IP header information, QoS information, bearer requirements, and the like. Using the packet information, processor 12 evaluates the ACL for the rule classes associated with each interface 28 (42A–42N). Processor 16 maps the rule classes to a set of priorities (44A–44N) to produce static priorities that are explicitly assigned for each rule class/interface (46A–46N). Using the priority updates, processor 16 performs the dynamic priority update (48). Processor 16 then selects the interface having the highest dynamic priority (50).

Figure 5:
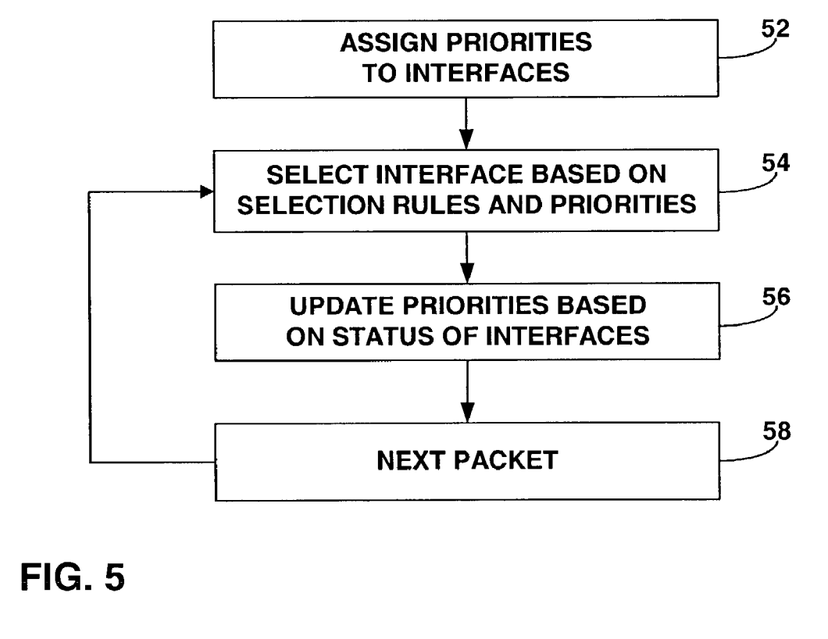
FIG. 5 is a flow diagram illustrating a general technique for selection of network interfaces for data communication in a wireless network.

FIG. 5 is a flow diagram illustrating a general technique for selection of network interfaces for data communication in a wireless network. As shown in FIG. 5, the technique may involve assigning priorities to various interfaces (52) accessible by AT 12, and selecting one of the interfaces based on a set of selection rules and the assigned priorities (54). The technique further may involve updating the priorities assigned to the interfaces (56), e.g., based on a change in the connection status of the interfaces. The updating of the priorities may occur independently of the processing of a given packet (58).

Figure 6:
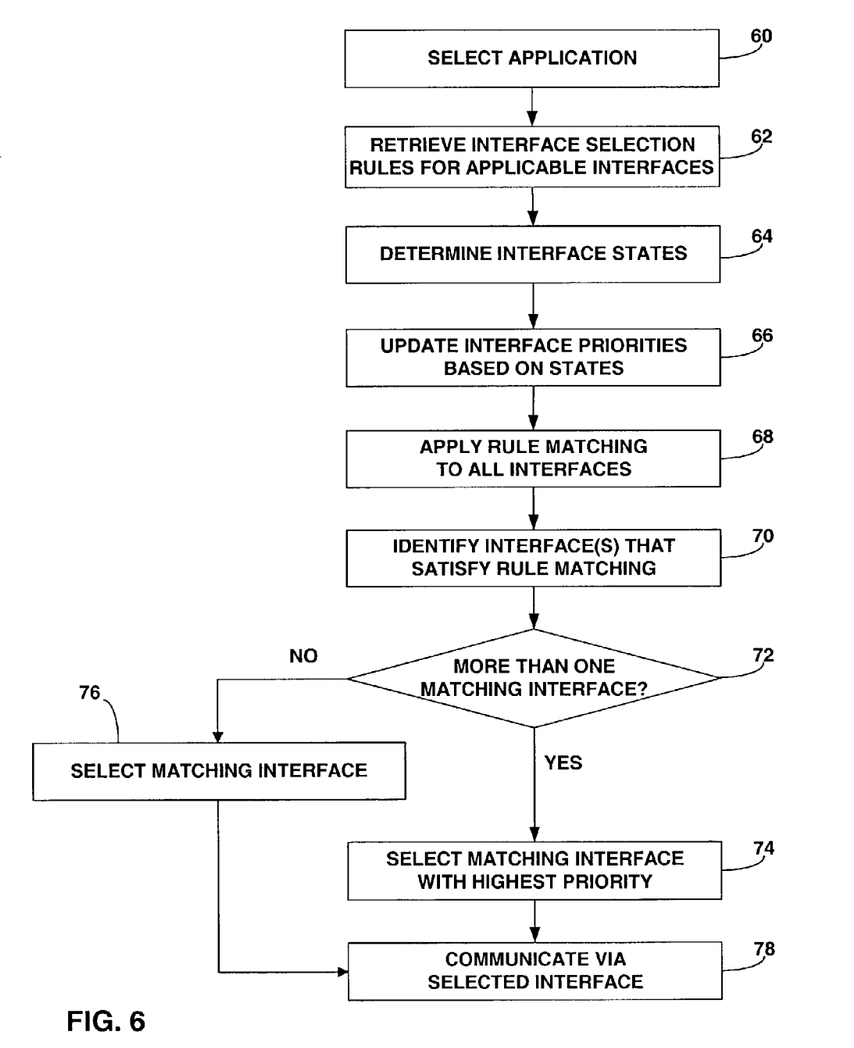
FIG. 6 is a flow diagram illustrating the technique of FIG. 5 in further detail.

FIG. 6 is a flow diagram illustrating the technique of FIG. 5 in further detail. The techniques illustrated in FIGS. 5 and 6 are exemplary and provided for purposes of illustration, and should not be considered limiting of the techniques broadly described and embodied herein. As shown in FIG. 6, the technique may involve selection of a particular communication application (60) for execution within AT 12. Selection of the communication application may be responsive to a user selection, such as the opening of a web browser, email application, or messaging application on AT 12. In addition, selection of the communication application may be responsive to connection of another device to AT 12, e.g., using the AT as a router between the device and a wide area or local area wireless network. The technique may involve retrieval, e.g., by processor 16, of interface selection rules for applicable interfaces (62) in response to receipt of a packet from the communication application. Again, the interface selection rules may take the form of a modified ACL. Upon determination of the interface connection states (64), processor 16 may assign explicit priorities to the interfaces, or rule classes associated with the interfaces, based on the connection states (66).

With further reference to FIG. 6, processor 16 applies rule matching to all of the interfaces (68) to identify qualified interfaces that satisfy all of the required rules (70), e.g., based on meta information carried with the packet under consideration. If there is more than one qualified, i.e., matching, interface (72), processor 16 selects the interface that holds the highest explicit priority (74). Again, in this example, processor 16 need not rely on the order of interfaces, or rule classes, within a list. Rather, processor 16 may be configured to processes the entire list completely, and refer to the explicit priorities for ultimate selection. If there is only one matching interface, processor 16 selects it (76). In each case, following interface selection, processor 16 uses the selected interface to serve the present packet for the pertinent communication application (78). The interface selection process may be performed as an initial lookup when a communication application is started, or repeatedly on a periodic or packet-by-packet basis.

The techniques described herein may be implemented in hardware, software, firmware, or any combination thereof. If implemented in software, the techniques may be realized by a computer readable medium comprising program code that, when executed, performs one or more of the methods described above. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. Data structures described herein may be stored in similar computer-readable media carried by AT 12.

The program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components within AT 12. In other cases, the processor may be implemented as a microprocessor, one or more application specific integrated circuits (ASICs), one or more field programmable gate arrays (FPGAs), or some other hardware-software combination. Although much of the functionality described herein may be attributed to processor 16 for purposes of illustration, the techniques described herein may be practiced within processor 16, modem 17, or both. In addition, structure and function associated with processor 16 or modem 17 may be integrated and subject to wide variation in implementation.

Various embodiments have been described. These and other embodiments are within the scope of the following claims.

The invention claim is:
1. A method comprising:
assigning dynamic priorities to wireless network interfaces;
selecting one of the wireless network interfaces for access by an access terminal based on interface selection rules and the dynamic priorities, wherein the dynamic priorities rank the wireless network interfaces in order of preference in an event more than one of the wireless network interfaces satisfy the interface selection rules; and updating the dynamic priorities assigned to the wireless network interfaces based on connection states of the interfaces such that a higher priority is assigned to one of the wireless network interfaces currently in a connected state with respect to the access terminal and a lower priority is assigned to one of the wireless network interfaces not currently in a connected state with respect to the access terminal.

2. The method of claim 1, further comprising selecting the interface selection rules based on an application requesting the access.

3. The method of claim 1, wherein the access comprises transmission of packets via the selected wireless network interface, the method further comprising selecting one of the wireless network interfaces for each of the packets on a packet-by-packet basis based on the interface selection rules and the dynamic priorities.

4. The method of claim 1, further comprising:
identifying one or more of the wireless network interfaces that satisfy the interface selection rules; and
in the event more than one of the wireless network interfaces are identified, selecting the identified wireless network interface to which the highest priority is assigned.

5. The method of claim 1, further comprising associating the interface selection rules with each of the wireless network interfaces, and storing the associations in a data structure in an order generally unrelated to the dynamic priorities assigned to the interfaces.

6. The method of claim 1, further comprising selecting one of the wireless network interfaces using different sets of the interface selection rules for different applications requesting the access.

7. The method of claim 1, further comprising assigning the dynamic priorities based at least in part on connection states and relative casts of the wireless network interfaces.

8. The method of claim 1, wherein the wireless network interfaces include at least one long-range wireless network interface and at least one short-range wireless network interface.

9. An access terminal that assigns dynamic priorities to wireless network interfaces, selects one of the wireless network interfaces for access based on interface selection rules and the dynamic priorities wherein the dynamic priorities rank the wireless network interfaces in order of preference in an event more than one of the wireless network interfaces satisfy the interface selection rules, and updates the dynamic priorities assigned to the wireless network interfaces based on connection states of the interfaces such that a higher priority is assigned to one of the wireless network interfaces currently in a connected state with respect to the access terminal and a lower priority is assigned to one of the wireless network interfaces not currently in a connected state with respect to the access terminal.

10. The access terminal of claim 9, wherein the access terminal selects the interface selection rules based on at least one of an application requesting the access and the type of traffic forwarded on behalf of another device.

11. The access terminal of claim 9, wherein the access comprises transmission of packets via the selected wireless network interface, and wherein the access terminal selects one of the wireless network interfaces for each of the packers on a packet-by-packet basis based on the interface selection rules and the dynamic priorities.

12. The access terminal of claim 9, wherein the access terminal identifies one or more of the wireless network interfaces that satisfy the interface selection rules, and, in the event more than one of the wireless network interfaces are identified, selects the identified wireless network interface to which the highest priority is assigned.

13. The access terminal of claim 9, wherein the access terminal associates the interface selection rules with each of the wireless network interfaces, and stores the associations in an order unrelated to the dynamic priorities assigned to the interfaces.

14. The access terminal of claim 9, wherein the access terminal selects one of the wireless network interfaces using different sets of the interface selection rules for different applications requesting the access.

15. The access terminal of claim 9, wherein the access terminal assigns the dynamic priorities based at least in part on connection states and relative costs of the wireless network interfaces.

16. The access terminal of claim 9, wherein the wireless network interfaces include at least one long-range wireless network interface and at least one short-range wireless network interface.

17. A computer-readable medium comprising instructions that cause a processor to assign dynamic priorities to wireless network interfaces in an access terminal, select one of the wireless network interfaces for access based on interface selection rules and the dynamic priorities wherein the dynamic priorities rank the wireless network interfaces in order of preference in an event more than one of the wireless network interfaces satisfy the interface selection rules, and update the dynamic priorities assigned to the wireless network interfaces based on connection states of the interfaces such that a higher priority is assigned to one of the wireless network interfaces currently in a connected state with respect to the access terminal and a lower priority is assigned to one of the wireless network interfaces not currently in a connected state with respect to the access terminal.

18. The computer-readable medium of claim 17, wherein the instructions cause the access terminal to select the interface selection rules based on at least one of an application requesting the access and the type of traffic forwarded on behalf of another device.

19. The computer-readable medium of claim 17, wherein the access comprises transmission of packets via the selected wireless network interface, and wherein the instructions cause the access terminal to select one of the wireless network interfaces for each of the packets on a packet-by-packet basis based on the interface selection rules and the dynamic priorities.

20. The computer-readable medium of claim 17, wherein the instructions cause the access terminal to identify one or more of the wireless network interfaces that satisfy the interface selection rules, and, in the event more than one of the wireless network interfaces are identified, select the identified wireless network interface to which the highest priority is assigned.

21. The computer-readable medium of claim 17, wherein the instructions cause the access terminal to associate the interface selection rules with each of the wireless network interfaces, and store the associations in an order unrelated to the dynamic priorities assigned to the interfaces.

22. The computer-readable medium of claim 17, wherein the instructions cause the access terminal to select one of the wireless network interfaces using different sets of the interface selection rules based one at least one of an application requesting the access and the type of traffic forwarded on behalf of another device.

23. The computer-readable medium of claim 17, wherein the instructions cause the access terminal to assign the dynamic priorities based at least in part on connection states and relative costs of the wireless network interfaces.

24. The computer-readable medium of claim 17, wherein the wireless network interfaces include at least one long-range wireless network interface and at least one short-range wireless network interface.

25. A device comprising:
means for assigning dynamic priorities to wireless network interfaces;
means for selecting one of the wireless network interfaces for access by an access terminal based on interface selection rules and the dynamic priorities wherein the dynamic priorities rank the wireless network interfaces in order of preference in an event more than one of the wireless network interfaces satisfy the interface selection rules; and
means for updating the dynamic priorities assigned to the wireless network interfaces based on connection states of the interfaces such that a higher priority is assigned to one of the wireless network interfaces currently in a connected state with respect to the access terminal and a lower priority is assigned to one of the wireless network interfaces not currently in a connected state with respect to the access terminal.

26. A method comprising:
assigning dynamic priorities to rule classes in an access control list (ACL); and
selecting wireless network interfaces associated with the rule classes for access by an access terminal based on rules set forth in the ACL and the dynamic priorities wherein the dynamic priorities rank the wireless network interfaces in order of preference in an event more than one of the wireless network interfaces satisfy the interface selection rules, and wherein a higher priority is assigned to one of the rule classes associated one of the wireless network interfaces currently in a connected state with respect to the access terminal and a lower priority is assigned to one of the rule classes associated wit one of the wireless network interfaces not currently in a connected state with respect to the access terminal.

27. The method of claim 26, further comprising updating the dynamic priorities assigned to the rule classes based on status of the interfaces.

28. An access terminal that assigns dynamic priorities to rule classes in an access control list (ACL), and selects wireless network interfaces associated with the rule classes for access by the access terminal based on rules set forth in the ACL and the dynamic priorities wherein the dynamic priorities rank the wireless network interfaces in order of preference in an event more than one of the wireless network interfaces satisfy the interface selection rules, wherein a higher priority is assigned to one of the rule classes associated one of the wireless network interfaces currently in a connected state with respect to the access terminal and a lower priority is assigned to one of the rule classes associated with one of the wireless network interfaces not currently in a connected state with respect to the access terminal.

29. The access terminal of claim 28, wherein the device updates the dynamic priorities assigned to the rule classes based on status of the interfaces.

30. A computer-readable medium comprising instructions to cause a processor within an access terminal to assign dynamic priorities to rule classes in an access control list (ACL), and select wireless network interfaces associated wit the rule classes for access by the access terminal based on rules set forth in the ACL and the dynamic priorities, wherein the dynamic priorities rank the wireless network interfaces in order of preference in an event more than one of the wireless network interfaces satisfy the interface selection rules, and wherein a higher priority is assigned to one of the rule classes associated one of the wireless network interfaces currently in a connected state with respect to the access terminal and a lower priority is assigned to one of the rule classes associated with one of the wireless network interfaces not currently in a connected state with respect to the access terminal.

31. The device of claim 30, wherein the instructions cause the processor to update the dynamic priorities assigned to the rule classes based on status of the interfaces.

32. A computer-readable medium comprising a data structure defining an access control list containing multiple rule classes for selection of wireless communication interfaces, and dynamic priorities associated with the rule classes wherein the dynamic priorities rank the wireless network interfaces in order of preference in an event more than one of the wireless communication interfaces satisfy the interface selection rules, and wherein a higher priority is assigned to one of the rule classes associated one of the wireless communication interfaces currently in a connected state and a lower priority is assigned to one of the rule classes associated with one of the wireless communication interfaces not currently in a connected state.

33. A method comprising:
updating dynamic priorities assigned to a plurality of wireless network interfaces based on connection states of the wireless network interfaces; and
selecting a preferred wireless network interface for access by an access terminal based on interface selection rules and the dynamic priorities, wherein the dynamic priorities rank the wireless network interfaces in order of preference in an event more than one of the wireless network interfaces satisfy the interface selection rules, and wherein a higher priority is assigned to one of the wireless network interfaces currently in a connected state with respect to the access terminal and a lower priority is assigned to one of the wireless network interfaces not currently in a connected state with respect to the access terminal.

34. A method in accordance with claim 33, wherein the updating comprises evaluating a cost of establishing a connection using a non-connected wireless network interface.

35. A method in accordance with claim 34, wherein the cost is monetary.

36. A method in accordance with claim 34, wherein the cost is latency in transmission of a communication packet.

37. A method in accordance with claim 33, wherein the selecting comprises:
applying an access control list (ACL) evaluation process to packet information to determine static priorities; and
selecting the preferred wireless network interface based on the dynamic priorities and the static priorities.

38. A method in accordance with claim 33, further comprising selecting the interface selection rules based on an application requesting the access.

39. A method in accordance with claim 38, wherein the access comprises transmission of packets via the selected wireless network interface, the method further comprising selecting one of the wireless network interfaces for each of the packets on a packet-by-packet basis based on the interface selection rules and the dynamic priorities.

40. An access terminal configured to:

update dynamic priorities assigned to a plurality of wireless network interfaces based on connection states of the wireless network interfaces; and select a preferred wireless network interface for access by an access terminal based on interface selection rules and the dynamic priorities wherein the dynamic priorities rank the wireless network interfaces in order of preference in an event more than one of the wireless network interfaces satisfy the interface selection rules, and wherein a higher priority is assigned to one of the wireless network interfaces currently in a connected state with respect to the access terminal and a lower priority is assigned to one of the wireless network interfaces not currently in a connected state with respect to the access terminal.

41. An access terminal in accordance with claim 40, the access terminal further configured to evaluate a cost of establishing a connection using a non-connected wireless network interface.

42. An access terminal in accordance with claim 41, wherein the cost is monetary.

43. An access terminal in accordance with claim 41, wherein the cost is latency in transmission of a communication packet.

44. An access terminal in accordance with claim 40, the access terminal further configured to:

apply an access control list (ACL) evaluation process to packet information to determine static priorities; and select the preferred wireless network interface based on the dynamic priorities and the static priorities.

45. A method comprising:

assigning dynamic priorities to wireless network interfaces;

selecting one of the wireless network interfaces for access by an access terminal on a packet-by-packet basis based on interface selection rules and the dynamic priorities wherein the dynamic priorities rank the wireless network interfaces in order of preference in an event more than one of the wireless network interfaces satisfy the interface selection rules; and updating the dynamic priorities assigned to the wireless network interfaces on a packet-by-packet basis based on connection states of the interfaces such that a higher priority is assigned to one of the wireless network interfaces currently in a connected state with respect to the access terminal and a lower priority is assigned to one of the wireless network interfaces not currently in a connected state with respect to the access terminal.

* * * * *